Fig. 1

INVENTORS
ROBERT P. MOORE
BELA J. KISH
FLOYD R. JENNINGS
BY
Hood, Gust & Irish
ATTORNEYS

Fig. 2

INVENTORS
ROBERT P. MOORE
BELA J. KISH
FLOYD R. JENNINGS
BY
Hood, Gust & Irish
ATTORNEYS

INVENTORS
ROBERT P. MOORE
BELA J. KISH
FLOYD R. JENNINGS
BY Hood, Gust & Irish
ATTORNEYS

INVENTORS
ROBERT P. MOORE
BELA J. KISH
FLOYD R. JENNINGS
BY
Hood, Gust & Irish
ATTORNEYS United States Patent Office 3,507,403
Patented Apr. 21, 1970

3,507,403
MATERIAL HANDLING APPARATUS
Robert P. Moore, Bela J. Kish, and Floyd R. Jennings, Indianapolis, Ind., assignors to Moorfeed Corporation, Indianapolis, Ind.
Filed Jan. 15, 1968, Ser. No. 697,937
Int. Cl. B25i 5/02; B65g 29/00
U.S. Cl. 214—1
6 Claims

ABSTRACT OF THE DISCLOSURE

A material handling apparatus comprising at least one major building block assembly comprising guide means, carriage means mounted for movement along the guide means and means for driving the carriage means along the guide means. The carriage means of each assembly is provided with a first dovetail tenon and the guide means of each assembly is formed to define a dovetail groove proportioned and arranged slidably to engage any such first dovetail tenon, whereby the guide means of one assembly can be selectively mounted on the carriage means of another assembly. Material gripping means and means for mounting the gripping means on one of the carriage means are provided. Preferably, each carriage is provided with a plurality of second dovetail tenons and the gripping means is provided with a second dovetail groove proportioned and arranged slidably to engage any such second tenon, whereby the gripping means can be selectively positioned on a carriage means. Further, preferably, means is provided for rocking the guide means of an assembly about an axis. Still further, preferably, means is provided for reciprocating the guide means of an assembly relative to the support means on which it is mounted.

---

It is a primary object of our invention to provide a material handling apparatus which can be constructed by assembing together one or more of several building block-type assemblies to obtain a desired movement of material from one point, such as a feeder track, to another point, such as a tool nest.

Specifically, it is an object of our invention to provide such an apparatus comprising at least one of our major building blocks, the structure of which will be discussed hereinafter, one of several means for mounting the major building block on a support means and a material gripping means.

Our major building block comprises guide means and carriage means mounted for movement between first and second predetermined positions on the guide means, the above-mentioned material gripping means being carried on the carriage means, and means for driving the carriage means between the first and second positions. It will be seen, as this description progresses, that the means for mounting this major building block on a support means may comprise still another identical building block, means for rocking the guide means of the major building block about an axis or means for reciprocating the guide means of the major building block.

Various contrivances have been developed which will pick up a part from one position and move it through a prescribed path to another position. However, to our knowledge, these devices have all been single-purpose devices in that they cannot be easily changed to move another part between two different positions along a still different prescribed path. Thus, our invention is an improvement over such prior art apparatus in that a parts manufacturer may purchase standard building block assemblies and arrange them in such a manner as to provide the desired parts movement capability.

Another object of our invention is to provide such a material handling apparatus further comprising a material gripping means and means for mounting the gripping means in a plurality of selected positions on a reciprocable carriage means.

Still another object of the present invention is to provide such a material handling apparatus wherein the major assemblies thereof are connected together by means of dovetail grooves and tenons so that each assembly can be selectively positioned relative to the assemblies connected thereto.

Further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific constructions illustrated and described, so long as the scope of the appended claims is not violated.

Referring to the drawings, it will be seen that there is illustrated a support means 10 comipirsing a vertically extending plate 12, base plate 14 and gusset plate 16. Preferably, the plates 12, 14 and 16 are steel and are welded or otherwise securely fastened together to provide a rigid structure. Also, preferably, the base plate 14 is provided with mounting holes, such as the illustrated mounting hole 18, so that the support means 10 can be securely mounted on a suitable platform.

It will be understood that the support means 10 is illustrated and described merely by way of example and that the various assemblies comprising our material handling apparatus may be mounted on or supported by any number of structures.

The major building block which we use is indicated generally by the reference numeral 20 and comprises a guide 22 and a carriage 24 mounted for movement on the guide 22. In the illustrative embodiment, the guide 22 is formed with a longitudinally extending dovetail tenon 26 (FIG. 5) and the carriage 24 is formed with a dovetail groove 28 arranged slidably to engage the tenon 26, thereby slidably to mount the carriage 24 on the guide 22.

Figures 3, 4, 5:
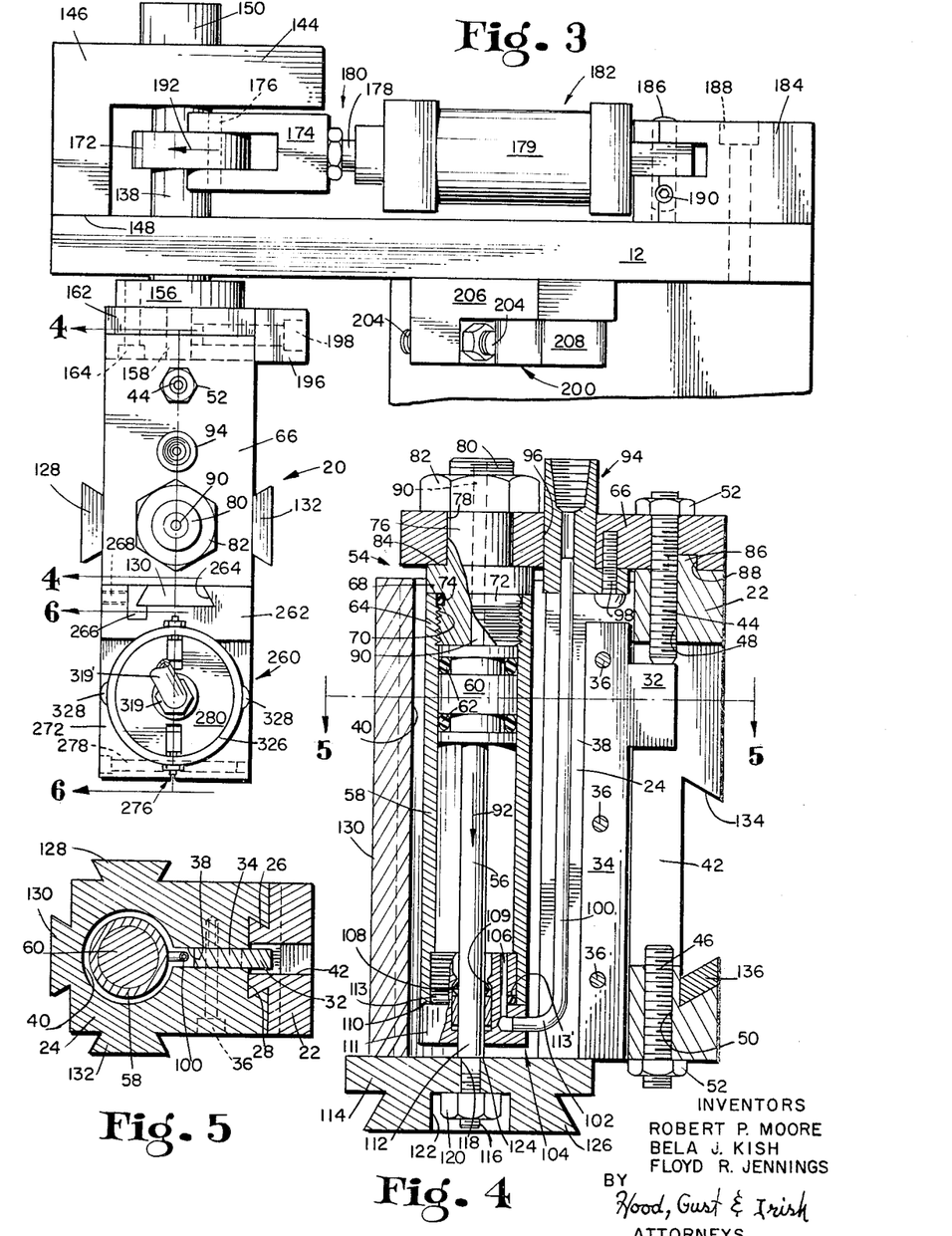
FIG. 3 is a fragmentary top view of the embodiment shown in FIGS. 1 and 2.
FIG. 4 is an enlarged, sectional view taken from FIG. 3 generally along the line 4—4.
FIG. 5 is a sectional view taken from FIG. 4 generally along the line 5—5.

Referring to FIGS. 4 and 5, it will be seen that the movement of the carriage 24 on the guide 22 is limited by the provision of a stop portion 32 of a plate 34 which is mounted on the carriage 24 by means such as the illustrated screws 36. The plate 34 is received in a longitudinally extending slot 38 (FIG. 5) formed in the carriage 24, the inner side of the slot 38 terminating in a longitudinally extending cylindrical opening 40 formed in the carriage 24 for a purpose which will be discussed hereinafter. The portion 32 extends from the slot 38 into a longitudinally extending slot 42 formed in the guide 22. An adjustable stop screw 44, 46 is disposed at each end of the slot 42 in the path of the portion 32 as clearly seen in FIG. 4, thereby selectively to establish the maximum travel of the carriage 24 relative to the guide 22. The stop screws 44 and 46 are threaded into openings 48 and 50 respectively in the guide 22 and conventional lock nuts 52 are threaded onto the outer end of each screw 44, 46 to keep the screw from changing position when it is struck by the portion 32.

A drive means is provided for moving the carriage 24 between the two positions established by the stop schews 44 and 46. Referring still to FIGS. 4 and 5, it will be seen that, in the illustrative embodiment, such drive means comprises a fluid motor, indicated generally by the reference numeral 54, of the type having a reciprocable piston rod 56 extending therefrom. The motor 54 comprises a cylinder 58 extending axially through the opening 40 in the carriage 24 and a piston 60 arranged for axial reciprocation in the cylinder 58, the piston rod 56 being connected to the piston 60 for movement therewith. The piston 60 carries a pair of conventional O-ring seals 62 which engage the inner peripheral surface of the cylinder 58.

One end 64 of the cylinder 58 is rigidly connected to a member 66 by means of an adapter 68, one end of which is threaded into an opening 70 in the end 64. Another O-ring seal 72 carried in an annular groove 74 in the adapter 68 is arranged to provide a seal between the adapter and the cylinder 58. A cylindrical portion 76 of the adapter 68 extends through a cylindrical opening 78 in the member 66, the outer portion 80 of the cylindrical portion 76 being threaded for engagement by a nut 82. When the nut 82 is tightened, a shoulder 84 of the adapter 68 is pulled tightly against the member 66, thereby rigidly to fasten the adapter 68 to the member 66.

The member 66 is rigidly connected to the guide 22 by means of the stop screw 44 and lock nut 52. Further, in the illustrative embodiment, the guide 22 is provided with a square tenon 86 which snugly engages a square groove 88 in the member 66 to prevent movement of the member 66 about the axis of the screw 44.

An axially extending passage 90 is formed in the adapter 68 as a means for admitting fluid to the end 64 of the cylinder 58. Thus, when fluid under pressure is admitted through the passage 90, the piston 60 is driven in the direction of the arrow 92.

A fitting 94 is mounted in an opening 96 in the member 66 and is secured there by means such as the illustrated screw 98 which threads into the member 66. The fitting 94 is connected to a tube 100 which extends downwardly through the slot 38 (FIG. 4). The end 102 of the tube 100 curves inwardly toward the cylinder 58 and is connected thereto as indicated at 104 to be in communication with a passage 106 formed in the fitting 111 closing the end 110 of the cyinder 58. Thus, when fluid under pressure is admitted to the cylinder 58 through the fitting 94, tube 100 and passage 106, the piston 60 will be driven in a direction opposite to the arrow 92. Another convention O-ring seal 108 is peripherally disposed about the piston rod 56 to provide a seal at the end 110 of the cylinder 58, the seal 108 being retained in an annular groove 109 formed in the fitting 111. Still another O-ring seal 113 is carried in an annular groove 113' of the fitting 111 is arranged to provide a seal between the fitting 111 and cylinder 58.

It will be understood that conventional valve means may be employed to connect the fitting 94 and the adapter 68 having the passage 90 therein to a pressurized fluid source so that the piston 60 can be controllably driven from end to end of the cylinder 58. Such valve means will be discussed in conjunction with FIG. 11.

The outer end 112 of the piston rod 56 is rigidly fastened to a member 114 as shown in FIG. 4. Specifically, the end 112 is provided with a reduced and threaded portion 116 which extends through an opening 118 in the member 114 to be threadedly engaged by a nut 120 which is received in a cavity 122 formed in the member 114. When the nut 120 is tightened, the member 114 is pulled tightly against the shoulder 124 formed on the piston rod 56. It will be apparent, therefore, that the member 114, which is formed to have a dovetail tenon 126 thereon, can be positioned about the axis of the piston rod 56 when the nut 120 is loosened. The reason for this adjustment will be discussed later in conjunction with FIG. 7.

Means (not shown) is provided for connecting the carriage 24 to the member 114 so that the carriage will reciprocate with the piston 60 and piston rod 56.

In the illustrative embodiment, the carriage 24 is formed with three longitudinally extending dovetail tensions 128, 130 and 132 clearly seen in the top view of FIG. 3 and the sectional view of FIG. 5. These tenons 128, 130 and 132 are provided to facilitate the mounting of a material gripping means, the structure of which will be discussed later, on the carriage 24. As seen clearly in FIGS. 1 and 2, the member 114 is large enough to provide a stop at the lower end of the tenons 128, 130 and 132.

The guide 22 is formed with a transversely extending dovetail groove 134 in its rear side to facilitate mounting of the guide on the support means 10. Conventionally, a gib 136 is disposed in the groove 134 as shown clearly in FIGS. 2 and 4.

In the embodiment of FIGS. 1–6, the guide 22 is rockably mounted on the support means 10. Specifically, a shaft 138 is journalled by means of a pair of bearings 140, 142 (FIG. 2), the bearing 140 being carried by the plate 12 and the bearing 142 being carried by an extension portion 144 of an L-shaped bracket 146 which is welded or otherwise securely fastened to the plate 12 at 148.

The bearing 142 is held in its cavity 143 by means of the retainer 150 mounted on the outer end of the shaft 138 and secured thereto by means of the set screw 152. The retainer 150 also prevents movement of the shaft 138 in the direction of the arrow 154 (FIG. 2).

Figure 2:
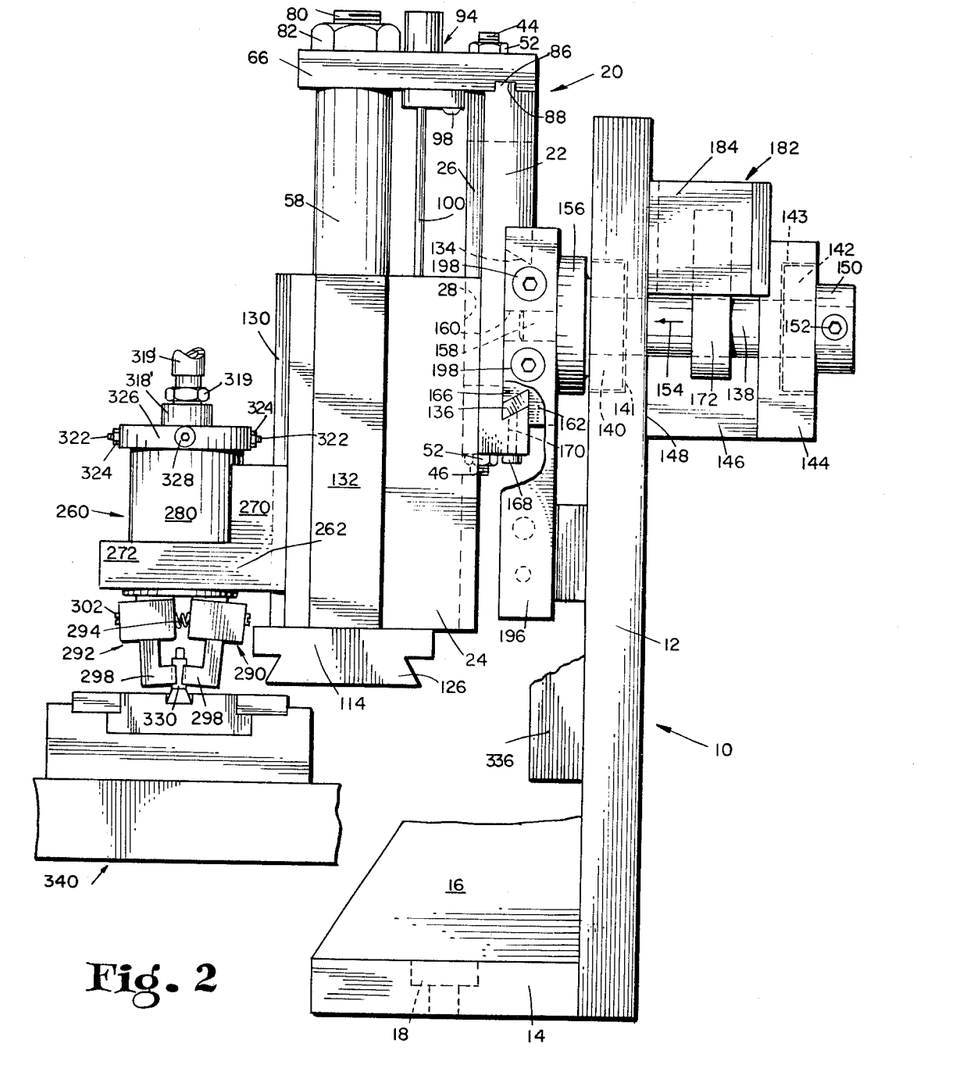
FIG. 2 is a side elevation view taken from the right-hand side of FIG. 1, the feeder track support being only fragmentarily shown to simplify the figure.

The portion of the shaft 138 to the left of the plate 12, as viewed in FIG. 2, is enlarged as indicated at 156 and reduced as indicated at 158. The enlarged portion 156 keeps the bearing 140 in its cavity 141 in the plate 12. The reduced portion 158, which extends axially outwardly from the enlarged portion 156, extends through an opening 160 in a mounting plate 162, the mounting plate 162 being secured to the enlarged portion 156 by means such as the illustrated screw 164 (FIG. 3) which threadedly engages the enlarged portion 156. The member 162 is, therefore, mounted for rotational rocking movement with the shaft 138.

As viewed in FIG. 2, it will be seen that the mounting plate 162 is formed with a dovetail tenon 166 thereon which is proportioned and arranged slidably to engage the dovetail groove 134 formed in the guide 22. A screw 168, which is threadedly engaged in an opening 170 in the guide 22, is provided for tightening the gib plate 136 against the tenon 166, thereby to position the guide 22 relative to the member 162.

It will be apparent, therefore, that the guide 22 may be adjustably positioned transversely relative to the axis of the shaft 138 by means of the dovetail arrangement just described.

In order to rock the guide 22 about the axis of the shaft 138, we mount an eccentric member 172 on the shaft and key it by suitable means (not shown) for rotation therewith. A yoke 174 is pivotally connected to the eccentric member 172 by means of a pin 176, the axis of which is parallel to and spaced apart from the axis of the shaft 138. The yoke 174 is connected as indicated at 180 to a piston rod 178 extending from one end of the cylinder 179 of a conventional fluid motor indicated generally by the reference numeral 182. The other end of the cylinder 179 is pivotally connected to a block 184 by means of a pin 186 which extends generally parallel to the axis of the shaft 138. The block 184 is rigidly fastened to the plate 12 by means such as the illustrated screw 188 and the pin 186 is held in the block 184 by means such as the illustrated set screw 190.

Figure 1:
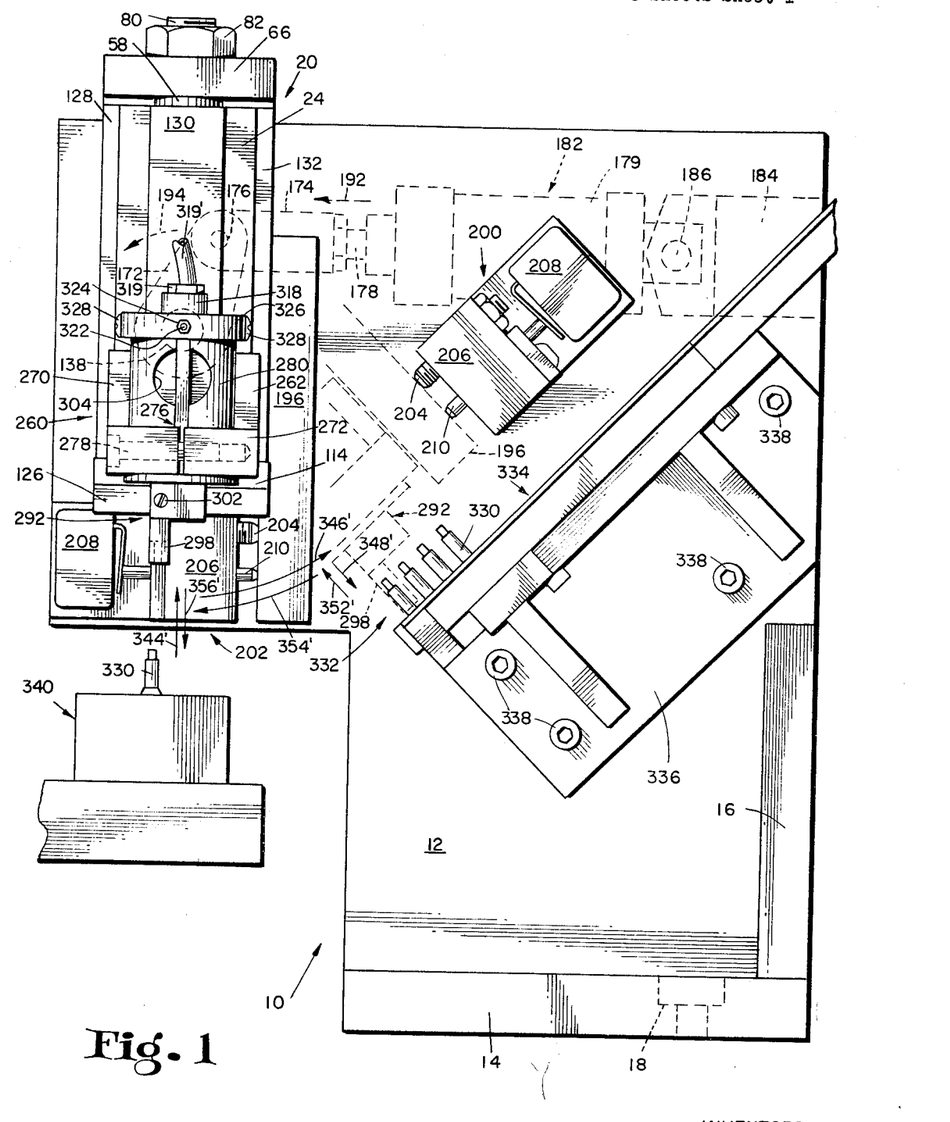
FIG. 1 is a front view of one embodiment of our apparatus arranged to move parts from a feeder track, only the exit portion of which is shown, to a toolnest, the support for which is only partially shown.

When the piston rod 178 is extended in the direction of the arrow 192 (FIG. 3) the shaft 138 will be rocked in the direction of the arrow 194 (FIG. 1). Similarly, when the piston rod 178 is retracted, the shaft 138 will be rocked in a direction opposite to the arrow 194.

In order to control the rocking movement of the guide 22, a control arm 196 is fastened to the member 162 by means such as the illustrated screws 198 so that the arm 196 will swing through the same arc as the guide 22. A pair of limit means 200, 202 is mounted on the support means 10 and in the path of the arm 196 to limit the movement thereof. The positions of the limit means 200, 202 are shown in FIG. 1. Each limit means 200, 202 comprises an adjustable stop screw 204 which is carried in a block 206 mounted by means (not shown) on the plate 12. Each screw 204 is disposed in the path of the arm 196 mechanically to stop the arm at the end of its travel.

Each limit means 200, 202 further comprises a micro-switch 208 mounted on the block 206 and a plunger 210 reciprocably mounted in the block 206, each plunger 210 being arranged to operate its associated micro-switch 208 when the plunger is engaged by the arm 196. Preferably, each plunger is arranged to engage the arm 196 and to operate its associated switch 208 just before the arm 196 strikes its associated stop screw 204. In a conventional manner, each switch 208 may be arranged to dominate one or more solenoid-operated valves to control the fluid motor 182, thereby to control the swing of the guide 22. Such a control system will be discussed in conjunction with FIG. 11a.

It will be apparent that each limit means 200, 202 is a conventional means for limiting the travel of an assembly. Thus, the limit means 200, 202 do not have to be discussed in greater detail in this description.

It will be understood that the illustrated means (FIGS. 1, 2 and 3) for rocking the guide 22 about an axis may be replaced by a torque motor connected directly to the shaft 138 on which the guide 22 is mounted. Such torque motors are commercially available and can be used to rock a shaft between two positions about its axis.

Figure 9:
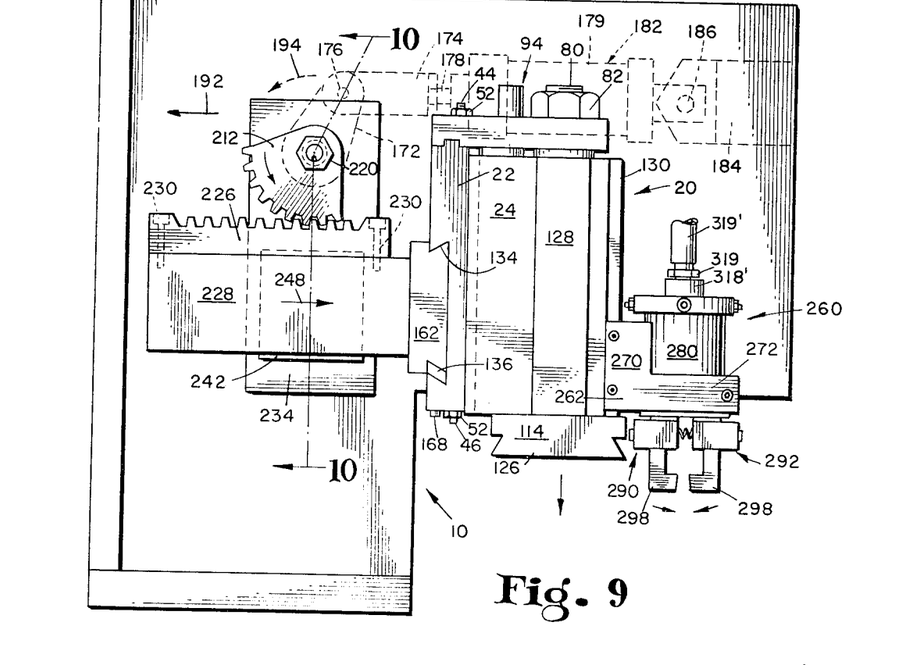
FIG. 9 is a front elevation of still another embodiment of our invention.
Figure 10:
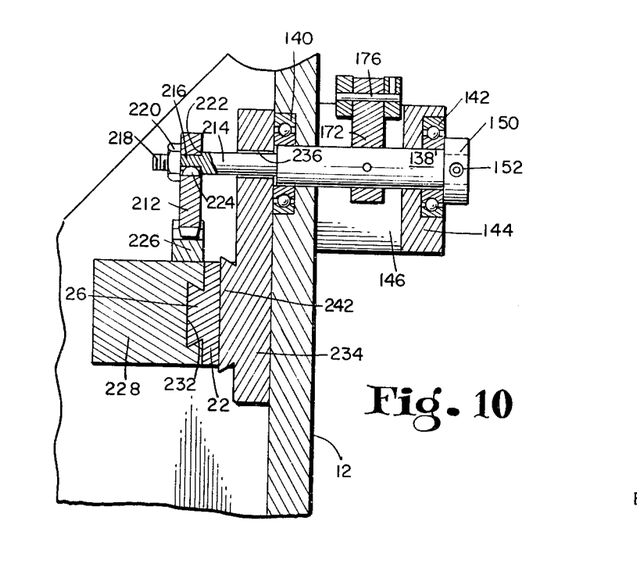
FIG. 10 is a fragmentary, sectional view taken from FIG. 9 generally along the line 10—10.

Referring now to FIGS. 9 and 10, it will be seen that the same drive means comprising the fluid motor 182 and eccentric member 172 can be used to reciprocate one of our major building blocks 20 relative to a support means 10. In FIGS. 9 and 10, like reference numerals indicate like parts.

Reciprocation of the plunger 178 results in a rocking movement of the shaft 138' (FIG. 10) as discussed previously. A segment gear 212 is mounted on the end 214 of the shaft 138' and is keyed thereto for rotation therewith. Specifically, the segment gear 212 is mounted on a reduced portion 216, the outer end of which is threaded as indicated at 218, and a nut 220 is threaded onto the shaft to hold the segment gear 212 against a shoulder 220 at the end of the reduced portion 216. A key 224 is arranged in a conventional manner to prevent rotation of the segment gear 212 relative to the shaft 138.

Figures 6, 7, 8:
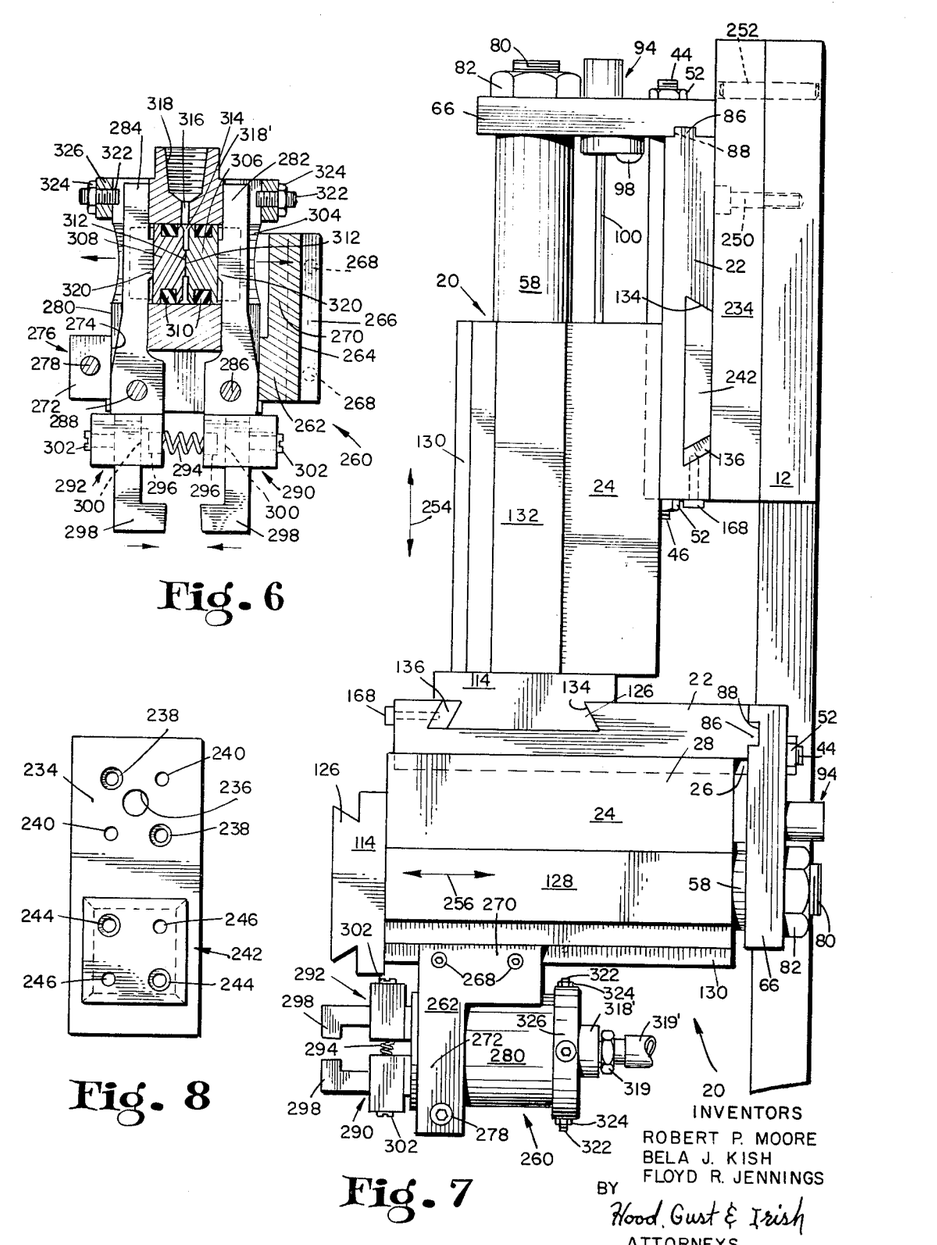
FIG. 6 is an enlarged, sectional view taken from FIG. 3 generally along the line 6—6.
FIG. 7 is a side elevation view of another embodiment of our invention.
FIG. 8 is an elevation view of a standard mounting plate used in our apparatus.

The segment gear 212 is meshed with a rack 226 which is rigidly fastened to a slider block 228 by means such as the illustrated screws 230. The slider block 228 is formed with a dovetail groove 232 (FIG. 10) which slidably engages the dovetail tenon 26 formed on a guide 22, the structure of which was discussed in conjunction with FIG. 4. The guide 22 is, in turn, mounted on a plate 234, the structure of which is shown in FIG. 8. Referring to FIG. 8, it will be seen that the plate 234 is provided with an opening 236 for receiving the reduced portion 214 of the shaft 138', counter sunk holes 238 for receiving mounting screws and holes 240 for receiving dowel pins which orient the plate 234 relative to the support on which it is mounted. A double dovetail tenon 242 is also formed on the plate 234 to be slidably engaged in the dovetail tenon 134 formed in the guides 22. It will be apparent, therefore, that the guides 22 can extend longitudinally of the plate 234 or transversely of the plate 234.

Within the boundary of the double dovetail tenon 242 are disposed two counter sunk holes 244 for receiving mounting screws and two holes 246 for receiving dowel pins. In the embodiment of FIG. 10, the plate 234 is mounted on the plate 12 by means of screws (not shown) which extend through the openings 244.

From the above description, it will be apparent that when the piston 178 is reciprocated in the direction of the arrow 192 (FIG. 9) the slider block 228 will be reciprocated in the direction of the arrow 248. Similarly, retraction of the piston 178 will cause reciprocation of the slider block 228 in a direction opposite to the arrow 248.

A member 162, the structure of which was discussed in conjunction with FIG. 2, is mounted on the end of the slider block 228 as shown in FIG. 9. A major building block 20 is then mounted on the member 162 for reciprocation with the slider block 228.

It will be apparent that the slider block 228 may be driven directly by a piston of a pneumatic cylinder. However, since it is a primary object of our invention to provide a material handling apparatus which can be constructed by assembling together a minimum number of standard assemblies, we find that it is more convenient to use the same driving means which we use to rock or swing our major building block 20 about an axis to reciprocate the building block relative to the axis.

Referring now to FIG. 7, it will be seen that we have illustrated two of our major building blocks 20 assembled together to provide a compound movement. In FIG. 7, like reference numerals also indicate like parts.

Specifically, a mounting plate 234 is rigidly attached to a plate 12 by means such as the illustrated screw 250 and dowel pin 252 respectively received in openings 238 and 240 formed in the plate 234. The guide 22 of one building block 20 is mounted on the plate 234 by means of the dovetail groove 134 and tenon 126 arrangement discussed previously.

The guide 22 of the second building block 20, i.e., the lower building block 20 in FIG. 7, is mounted on the member 114 of the upper building block also by means of the dovetail groove 134 and tenon 126 arrangement previously described.

In the embodiment of FIG. 7, the carriage 24 of the upper building block 20 is reciprocable in the direction of the arrow 254 and the carriage 24 of the lower building block 20 is reciprocable in the direction of the arrow 256 which is generally perpendicular to the arrow 254. It will be remembered that the member 214 is adjustable about the axis of the piston rod 56, i.e., the axis of the cylinder 58, and, therefore, the direction of movement of the lower carriage 24 can be adjusted about the axis of the cylinder 58. It will be apparent that the upper building block 20 comprises means for mounting the lower building block 20 on the plate 12. It will further be apparent that, within the scope of our invention, the upper building block 20 may be rockably mounted on the plate 12 as discussed previously in conjunction with FIGS. 1, 2 and 3. Still further, it will be apparent that the upper building block 20 may be mounted for reciprocation relative to the plate 12 as discussed previously in conjunction with FIGS. 9 and 10.

Referring now to FIGS. 1, 2, 3 and 6, the illustrated material gripping means 260 will be discussed.

The material gripping means 260 comprises a frame 262 formed with a dovetail groove 264 (FIG. 3) for slidably receiving any one of the dovetail tenons 128, 130 and 132 formed on the carriage 24, thereby adjustably to position the frame 262 on the carriage 24. Referring specifically to FIG. 3, it will be seen that in the illustrative embodiment, the frame 262 is shown as being mounted on the tenon 130 and a conventional gib 266 and screw 268 arrangement is provided for locking the frame 262 in a selected position on the tenon 130.

It will also be apparent that the dovetail groove 264 may be formed large enough slidably to receive the dovetail tenon 126 formed on the member 114 of a building block 20 so that the frame 262 can be mounted transversely relative to the tenons 128, 130 and 132. Alternatively, of course, the tenon 126 may be formed small enough slidably to engage the groove 264.

The frame 262 has a back portion 270 in which the groove 264 is formed and an outwardly extending portion 272 formed with a cylindrical opening 274 (FIG. 6) which, in the illustrative embodiment, extends generally parallel to the dovetail groove 264. This outwardly extending portion 272 is split as indicated at 276 (FIGS. 1, 3 and 6) and a screw 278 is arranged to draw the split portions together, thereby to control the diameter of the opening 274.

A cylindrical member 280 is axially disposed in the opening 274. The member 280 is selectively and adjustably positioned by loosening the screw 278, rotating the member 280 about its axis in the opening 274 and/or moving the member 280 axially and then tightening the screw 278.

Referring now to FIG. 6, it will be seen that a pair of spaced apart levers 282 and 284 are pivotally mounted on the member 280 by means of pins 286 and 288, respectively, the pins 286 and 288 extending generally perpendicular to a plane including the axis of the member 280. Adapters 290 and 292 are attached to the lower ends (FIG. 6) of the levers 282 and 284 respectively and a spring 294 is disposed between the adapters 290 and 292 yieldably to urge the adapters apart. The ends of the spring 294 are received in cut outs 296 formed in the adapters 290, 292.

Each adapter 290, 292 is arranged to mount a jaw element, such as the illustrated L-shaped jaw elements 298, on its associated lever 282, 284. In the illustrative embodiment, the upper ends of the jaw elements 298 are received in openings 300 and are secured in such openings by means of the illustrated screws 302.

A cylindrical opening 304 is formed in the member 280, the axis of this opening preferably intersecting the axis of the member 280 and being perpendicular to planes which are paralled to the axis of the member 280 and which respectively include the axes of the pins 286 and 288. A pair of pistons 306 and 308 is arranged for independent axial reciprocation in the opening 304. Each piston 306, 308 carries a conventional O-ring seal 310 which engages the inner peripheral wall of the opening 304. Further, as clearly seen in FIG. 6, a boss 312 is formed on the innermost end of each piston 306, 308 so that there will always be a space 314 between the pistons. A passage 316 is formed in the member 280 to be in communication with the space 314. The upper end of the passage 316 terminates in a threaded opening 318 which serves as a fitting 318' for connecting the passage to a pressurized fluid source. In FIGS. 1, 2, 3, 7 and 9, a fitting 319 and tube 319' are shown connected to the fitting 318'.

The outermost end of each piston 306, 308 is formed with a slot (not shown) for receiving a tang 320 extending inwardly from a lever 282, 284. When fluid, under pressure, is admitted to the space 314, the pistons 306, 308 will be urged in the direction of the arrows 320' to shift the levers 282 and 284 against the tendency of the spring 294.

The outward movement of the upper end of each lever 282, 284 is limited by an adjustable stop screw 322 as clearly seen in FIG. 6. A conventional lock nut 324 is threaded onto the outer end of each screw 322. The screws 322 are threaded into a ring 326 which is disposed peripherally about the member 280 and held in position by means of set screws 328 as seen in FIGS. 1–3.

Since the levers 282 and 284 and all the members associated therewith are carried by the member 280, it will be apparent that the levers are rotatably and axially adjustable with the member 280 relative to the frame 262.

Each lever 282, 284, its adapter 290, 292 and the jaw element 298 connected thereto comprises finger means effective, when actuated, to engage a part. Referring to FIGS. 1 and 2, it will be seen that the material gripping means 260 is arranged to grip and carry rivets 330. Of course, the rivets 330 are illustrated merely as an example of the capability of our invention.

In the illustration of FIG. 1, the rivets 330 are fed to a point, indicated generally by the reference numeral 332, by a feeder track, indicated generally by the reference numeral 334, only a portion of which is shown. The exit end of the feeder track 334 is mounted on a support 336 which is secured to the plate 12 by means such as the illustrated screws 338. The specific construction of the feeder track 334 is not a part of this invention and, therefore, need not be discussed in detail in this description.

By way of example, it will be assumed that each rivet 330 is to be picked up from the position 332 and moved to a tool nest indicated generally by the reference numeral 340. The tool nest 340 is also not a part of this invention and need not be discussed in detail herein.

Figures 11, 11A, 12:
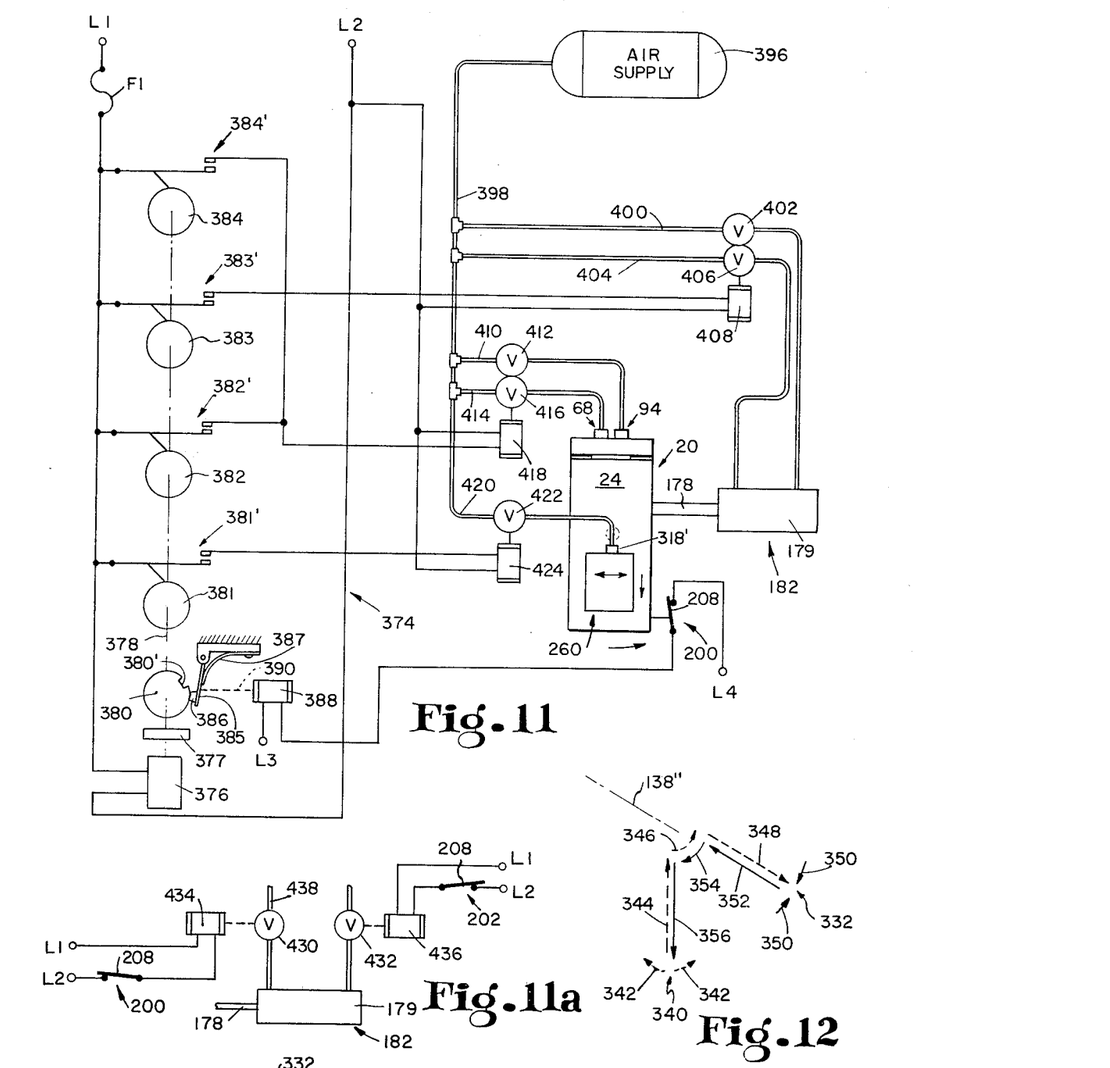
FIG. 11 is a schematic diagram of a typical control system for our apparatus.
FIG. 11a is a partial schematic diagram of an alternative control system for our apparatus.
FIG. 12 is a diagrammatic view illustrating one of the many series of movements which can be obtained with our apparatus.

Referring now to FIG. 12, the movements necessary to pick up a rivet from the point 332 and to move it to the tool nest 340 will be discussed. In FIG. 12, the axis 138″ represents the axis of the shaft 138. At the tool nest 340, the jaw elements 298 will be spread apart as indicated by the broken-line arrows 342 to deposit a rivet 330 into the tool nest 340. Thereafter the carriage 24 and the material gripping means 260 will move rectilinearly in the direction of the broken-line arrow 344, swing in the direction of the broken-line arrow 346, and then move rectilinearly in the direction of the broken-line arrow 348 to the point 332 where the jaw elements 298 will move together as indicated by the solid-line arrows 350 to grip a rivet 330. After a rivet 330 is gripped between the jaw elements 298, the rivet will be moved by the carriage rectilinearly in the direction of the solid-line arrow 352, swung through an arc indicated by the solid-line arrow 354 and then moved rectilinearly in the direction of the solid-line arrow 356 to the tool nest 340, where the jaws 298 will be separated again to release and deposit the rivet.

It will be understood that, in some cases, it may be advantageous to drive the carriage 24 along the guide 22 at the same time that the guide 22 is being rotated about the axis of the shaft 138. In such a case, the jaw elements 298 will move in an arcuate path between the point 332 and the tool nest 340.

Referring again to FIG. 1, it will be seen that when the control arm 196 is against the stop screw 204 of the limit means 200, as suggested by the dash-line drawing of the arm 196, the jaw elements 298 are in a position to grip a rivet 330 at the point 332.

Further, in FIG. 1, we have illustrated arrows 344', 346', 348', 352', 354' and 356', each of which corresponds to its correspondingly numbered arrow in FIG. 12.

Figure 13:
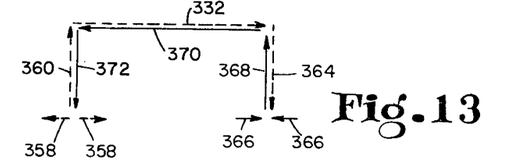
FIG. 13 represents still another series of movements which can be obtained with our apparatus.

Referring now to FIG. 13, a movement diagram corresponding to the embodiment of FIGS. 9 and 10 will be discussed. In FIG. 13, the broken-line arrows 358 represent the movement of the jaw elements 298 in releasing a part held thereby. After the jaw elements 298 have been separated to release a part, the jaw elements will be moved in the direction of the broken-line arrow 360, then in the direction of the broken-line arrow 362 and then in the direction of the broken-line arrow 364 to a point where they can be closed as indicated by the solid-line arrows 366 to grip another part. After a part is gripped, as indicated by the arrows 366, it will be moved through a path defined by the solid-line arrows 368, 370 and 372 to a point where it will be released by the movement of the jaw elements 298 in the direction of the arrows 358.

Although, in the illustrative embodiment, the material gripping means 260 is a clamping-type gripper, it will be understood that, in the broadest form of our invention, the material gripping means may take any number of forms. For instance, in lieu of the jaw elements 298, an electro-magnetic device may be provided for picking up parts fabricated of magnetic material. Similarly, a vacuum-type device for picking up parts may be carried on the frame 262.

It will also be understood that the jaw elements 298 may be urged outwardly to engage the inner periphery of a part thereby to pick up the part.

Any number of control systems can be provided for controlling the operation of our material handling apparatus in its various forms. Thus, we have chosen to illustrate a suitable control system in FIG. 11, which control system is arranged to operate the embodiment of FIGS. 1–3.

Referring to FIG. 11, it will be seen that there is illustrated timer means 374 comprising a timer motor 376, a cam shaft 378 upon which are mounted cams 380, 381, 382, 383 and 384 for rotation therewith. A slip clutch 377 couples the cam shaft 378 to the motor 376. The motor 376 is energized continuously by current supplied from a conventional alternating current source, one side of which is indicated by L1 and the other side of which is indicated by L2.

A conventional fuse F1 is connected in series with L1 as illustrated.

The cam 380 is provided with a single notch 380' in its peripheral contour and a lever 385 carrying a follower 386 is urged toward the contour of the cam 380 by means such as the illustrated leaf spring 387 so that the follower 386 will engage the notch 380' to stop the cam shaft 378. A solenoid 388 is mechanically linked to the lever 385 by means indicated at 390 so that, when the solenoid 388 is energized, the lever 385 will be pulled outwardly from the cam 380 to permit the cam shaft 378 to be rotated through the clutch 377 by the motor 376. The clutch 377 will slip and the cam shaft 378 will not rotate as long as the follower 386 is engaged in the notch 380'.

The coil of the solenoid 388 is preferably connected through the switch 208 of the limit means 200 to a power source, indicated by L3 and L4. This power source is arranged momentarily to energize the solenoid 388 to disengage the follower 386 from the notch 380' when the arm 196 (FIG. 1) is agianst the limit means 200 and the switch 208 thereof is closed. Once the arm 196 moves away from the limit means 200, the switch 208 of the limit means 200 will open and the solenoid 388 will be deenergized to permit the follower 386 to ride on the contour of the cam 380. The current necessary for momentarily energizing the solenoid 388 may be supplied, at the proper time, by means (not shown) associated with the tool nest 340.

Switches 381', 382', 383' and 384' are associated with their respectively numbered cams 381, 382, 383 and 384.

There is illustrated a pressurized air supply 396 and a main air line 398. An air line 400 is connected from the main air line 398 through a valve 402 to one end of the cylinder 179 and another air line 404 is connected from the main air line 398 through a valve 406 to the opposite end of the cylinder 179. The valves 402 and 406 are operated by a solenoid 408 which is arranged alternatively to open and close the valves. That is, when the valve 402 is open, the valve 406 is closed and the piston rod 178 is projected from the cylinder 179. When the valve 402 is closed, the valve 406 is open and the piston 178 is retracted into the cylinder 179. One side of the coil of the solenoid 408 is connected directly to L2 and the other side of the coil is connected through the switch 383' to L1, the switch 383' being operated by the cam 383. Thus, the rocking movement of the building block 20 is controlled by the cam-operated switch 383'.

An air line 410 is connected from the main air line 398 through a valve 412 to the fitting 94 and through the fitting 94 to one end of the cylinder 58. Another air line 414 is connected from the main air line 398 through a valve 416 to the adapter 68 which has the passage 90 formed therein and leading to the other end of the cylinder 58. A solenoid 418 is operatively connected to the valves 412 and 416 alternatively to open and close the valves. One side of the coil for the solenoid 418 is connected directly to L2 and the other side of the coil is connected through the switches 382' and 384' to L1, the switches 382' and 384' being connected in parallel so that the solenoid 418 will be energized when either or both of the switches 382' and 384' are closed. Specifically, the carriage 24 will be extended when the valve 416 is open and retracted when the valve 412 is open. The two switches 382' and 384' are provided because the carriage 24 is preferably extended and retracted twice during each cycle of the apparatus.

Another air line 420 is connected from the main air line 398 through a valve 422 to the fitting 318' in communication with the cylinder 304 (space 314) of the material gripping means 260, the valve 422 being controlled by a solenoid 424. One side of the coil of the solenoid 424 is connected directly to L2 and the other side of the coil of the solenoid 424 is connected through the switch 381' to L1. The operation of the material gripping means 260 is, therefore, controlled by the operation of the switch 381'. The valve 422 is preferably arranged so that, when the solenoid 424 is deenergized, the air in the cylinder 304 can be exhausted through the valve.

It will be understood that the control system of FIG. 11 may be modified in any number of ways to provide the desired movement of parts. For instance, the valve 402 and the valve 416 can be opened sequentially or simultaneously. If the valves 402 and 416 are opened sequentially, and the valves 406 and 412 are opened sequentially, the movement of a part held by the jaw elements 298 will be substantially as shown in FIG. 12. If the valve 402 and the valve 416 are operated simultaneously and then the valve 406 and the valve 412 are operated simultaneously, the parts held by the jaw elements will move through an arcuate path.

It will also be understood that conventional pressure regulating means (not shown) may be provided in each of the air lines 398, 400, 404, 410, 414 and 420 so that the rate of movement of pistons by air supplied through the lines can be adjusted to correspond to the speed of the timer motor 376.

It will also be understood that the use of a timer to control the valves 402, 406, 412, 416 and 422 is merely illustrative and that such valves can be operated by solenoids which are controlled by limit means similar to the limit means 200, 202.

As discussed previously in conjunction with FIG. 1, the motor 182 may also be controlled by valves 430 and 432 (FIG. 11a) which are operated respectively by solenoids 434 and 436, the valve 430 being connected in an air line 438 leading to one end of the cylinder 179 and the valve 432 being connected in another air line leading to the opposite end of the cylinder. Each valve 430, 432 is arranged to be open when its associated solenoid 434, 436 is energized. In FIG. 11a, we show the coil of solenoid 434 connected in series with the switch 208 of the limit means 200 between L1 and L2 and the coil of solenoid 436 connected in series with switch 208 of limit means 202 between L1 and L2.

The terms "dovetail tenon" and "dovetail groove" as used in the present specification and in the appended claims, is intended to be broadly interpreted to include any groove and tenon arrangement for slidably mounting a first assembly on a second assembly, whereby the first assembly can be selectively positioned relative to the second assembly or the first assembly can be freely reciprocated relative to the second assembly.

It will be perceived that, according to the present invention, a material handling apparatus capable of an infinite variety of movements may be readily assembled, by manufacturing personnel who are not necessarily skilled tool makers, from a selected number of identical assemblies, such as our major building block 20; and that the apparatus may as readily be remodeled at any time at the whim of such personnel merely by rearranging the several assemblies, adding another assembly, or removing an assembly.

Our major building block 20 is a tool assembly which is very compact, versatile and easy to use. The building block 20 is compact because its carriage 24 is disposed peripherally about the cylinder 58 comprising the fluid motor 54, the axis of the cylinder 58 being generally parallel to the axis of the guide 22. When the carriage 24 is fully retracted, the guide 22, carriage 24 and cylinder 58, all of which are generally of the same length, are side by side.

What is claimed is:

1. An apparatus of the character described comprising support means, guide means, means for mounting said guide means on said support means, carriage means mounted for movement between first and second predetermined positions on said guide means, means for driving said carriage means between said positions, and material gripping means carried on said carriage means for movement therewith, said material gripping means including frame means, means for mounting said frame means in any one of a plurality of selected positions on said carriage means, a pair of fingers carried by said frame means, spring means connected between said fingers, and actuating means for closing said fingers in opposition to said spring means, said actuating means including a pair of pistons, said frame means being formed with an opening, said pistons being arranged for axial reciprocation in said opening, means carried by at least one of said pistons arranged to hold said pistons in a spaced-apart relationship to define a space therebetween, said frame means further being formed with a passage communicating with said space so that, when fluid under pressure is admitted to said space through said passage, said pistons will be urged apart, and one of said pistons being operatively connected to one of said fingers and the other of said pistons being operatively connected to the other of said fingers.

2. An apparatus of the character described comprising support means, guide means, means for mounting said guide means on said support means, carriage means mounted for movement between first and second predetermined positions on said guide means, means for driving said carriage means between said positions, and material gripping means carried on said carriage means for movement therewith, said material gripping means including frame means, means for mounting said frame means in any one of a plurality of selected positions on said carriage means, a pair of fingers carried by said frame means, spring means connected between said fingers, and actuating means for closing said fingers in opposition to said spring means, said frame means including a cylindrical member and a bracket proportioned and arranged releasably and peripherally to grip said cylindrical member, said fingers being carried by said cylindrical member, whereby said fingers are adjustably movable with said cylindrical member about its axis relative to said bracket.

3. An apparatus of the character described comprising support means, guide means, means for mounting said guide means on said support means, carriage means mounted for movement between first and second predetermined positions on said guide means, means for driving said carriage means between said positions, and material gripping means carried on said carriage means for movement therewith, said material gripping means including frame means, means for engaging material, said engaging means being carried on said frame means, means for actuating said engaging means, said carriage means being formed with a plurality of longitudinally and transversely extending dovetail tenons formed thereon, and means on said frame means defining a dovetail groove for slidably engaging any such dovetail tenon, thereby selectively to position said material gripping means on said carriage means, said frame means including a cylindrical member and a bracket proportioned and arranged releasably and peripherally to grip said cylindrical member, said engaging means being carried by said cylindrical member, whereby said engaging means is adjustably movable with said cylindrical member about its axis relative to said bracket.

4. An apparatus of the character described comprising support means, guide means, means for mounting said guide means on said support means, carriage means mounted for movement between first and second predetermined positions on said guide means, means for driving said carriage means between said positions, and material gripping means carried on said carriage means for movement therewith, said mounting means including a second guide means identical to the first-mentioned guide means and a second carriage means identical to the first-mentioned carriage means, first means for connecting said second guide means to said support means, second means for rigidly connecting said first-mentioned guide means to said second carriage means, said second connecting means comprising means on said second carriage means defining a dovetail tenon and means on said first-mentioned guide means defining a dovetail groove proportioned and arranged slidably to engage said tenon, whereby said first-mentioned guide means can be selectively positioned along said tenon and means mounting said dovetail tenon defining means for rotational adjustment relative to the axis of said second carriage means.

5. An apparatus of the character described comprising a plurality of major building block assemblies each comprising guide means, carriage means mounted for movement along said guide means and means for driving said carriage means along said guide means, means defining a first dovetail tenon on each carriage means, each guide means being formed with a dovetail groove proportioned and arranged slidably to engage any such first dovetail tenon, whereby the guide means of one assembly can be selectively mounted on the carriage means of any other such assembly, material gripping means, means for mounting said gripping means on one of said carriage means, and means mounting said first tenon means for rotational adjustment about an axis generally parallel to the guide means on which said carriage means is mounted, whereby the guide means of one assembly can be rotatably adjusted about an axis which is generally parallel to the guide means of another assembly on which said one assembly is mounted.

6. An apparatus as in claim 3 wherein said engaging means comprises a pair of spaced-apart fingers, each of said fingers being pivotally connected at a point intermediate its ends to said cylindrical member, a spring disposed between said fingers at one side of their respective pivot points, and said actuating means being operatively connected to said fingers at the opposite side of their respective pivot points, whereby the movement of said fingers by said actuating means is in opposition to said spring.

References Cited

UNITED STATES PATENTS

| | | |
|---|---|---|
| 2,858,947 | 11/1953 | Chapman. |
| 3,405,812 | 10/1968 | Kolbus. |
| 3,422,967 | 1/1969 | Aron. |
| 1,804,971 | 5/1931 | Bullard. |
| 2,894,616 | 7/1959 | Young. |
| 3,306,442 | 2/1967 | Devol. |

FOREIGN PATENTS

| | | |
|---|---|---|
| 955,715 | 4/1964 | Great Britain. |

GERALD M. FORLENZA, Primary Examiner

G. F. ABRAHAM, Assistant Examiner

U.S. Cl. X.R.

29—38